(12) United States Patent
Korcz et al.

(10) Patent No.: US 9,334,981 B2
(45) Date of Patent: May 10, 2016

(54) CONDUIT HANGER

(71) Applicant: HUBBELL INCORPORATED, Shelton, CT (US)

(72) Inventors: Krzysztof W. Korcz, Grainger, IN (US); Steven J. Johnson, Buchanan, MI (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 14/337,451

(22) Filed: Jul. 22, 2014

(65) Prior Publication Data

US 2015/0021446 A1   Jan. 22, 2015

Related U.S. Application Data

(60) Provisional application No. 61/857,028, filed on Jul. 22, 2013.

(51) Int. Cl.
*F16L 3/12*   (2006.01)
*F16L 3/04*   (2006.01)
*F16L 3/127*  (2006.01)

(52) U.S. Cl.
CPC ................. *F16L 3/1215* (2013.01); *F16L 3/04* (2013.01); *F16L 3/12* (2013.01); *F16L 3/127* (2013.01); *Y10T 24/44769* (2015.01)

(58) Field of Classification Search
CPC ............. F16L 3/04; F16L 3/12; F16L 3/1215; F16L 3/127; Y10T 24/44769
USPC ............................. 248/58, 65, 74.1, 300, 340
See application file for complete search history.

(56) References Cited

U.S. PATENT DOCUMENTS

| | | | | |
|---|---|---|---|---|
| 240,736 A | * | 4/1881 | Leeds | F16L 3/04 248/300 |
| 1,416,679 A | | 5/1922 | Barry | |
| 2,578,993 A | * | 12/1951 | Downs | F24D 19/04 248/232 |
| 2,723,816 A | * | 11/1955 | Drysdale | B42F 15/0041 248/229.13 |
| 3,014,680 A | * | 12/1961 | Steinbach | F21V 19/00 248/300 |
| 3,034,185 A | * | 5/1962 | Olsen | E04B 1/2612 248/56 |
| 3,325,131 A | * | 6/1967 | Englander | B65G 21/2072 193/38 |
| 3,532,311 A | | 10/1970 | Havener | |
| 3,536,281 A | * | 10/1970 | Attore | F16B 7/0493 220/3.9 |
| 4,010,348 A | * | 3/1977 | Salinger | F24C 7/065 15/259 |
| 4,039,744 A | * | 8/1977 | Seaquist | H01B 17/18 174/169 |

(Continued)

FOREIGN PATENT DOCUMENTS

| DE | 1199543 B | * | 8/1965 | ................ F16L 3/12 |
| FR | 1418227 A | * | 11/1965 | .............. F16B 2/246 |

(Continued)

*Primary Examiner* — Terrell McKinnon
*Assistant Examiner* — Eret McNichols
(74) *Attorney, Agent, or Firm* — Dickinson Wright PLLC

(57) ABSTRACT

The hanger member for supporting a conduit or bundle of wires is provided as a one piece unitary member. The hanger member has a planar first leg with an open recess extending inwardly from a first side edge of the first leg and a second leg coupled to the first leg along adjoining top edges defined by a fold line. The second leg has an open recess from a second side edge where the open recess is aligned with the open recess in the first leg to define a conduit passage. The bottom portion of the first leg and the bottom portion of the second leg are spaced apart a distance for connecting to the conduit. The top portions of the first leg and second leg are superimposed and continuous with each other for attaching directly to a support structure.

18 Claims, 3 Drawing Sheets

(56) References Cited

U.S. PATENT DOCUMENTS

| | | | |
|---|---|---|---|
| 4,097,015 A | 6/1978 | Frishman | |
| D265,508 S * | 7/1982 | Rusteberg | D24/128 |
| D276,212 S * | 11/1984 | Villanueva | D6/553 |
| 4,673,151 A * | 6/1987 | Pelz | F16L 3/1215 24/336 |
| 4,697,770 A * | 10/1987 | Kirschner | F16L 3/02 248/62 |
| 4,714,219 A * | 12/1987 | Mayse | F16L 3/08 248/65 |
| 4,823,752 A * | 4/1989 | Uuskallio | F16B 2/10 123/366 |
| 4,858,861 A | 8/1989 | Wilkinson, III | |
| 4,870,722 A | 10/1989 | Shell, Jr. | |
| 4,991,801 A | 2/1991 | Trumbull | |
| 4,997,147 A * | 3/1991 | Velke, Sr. | F16L 3/1215 248/230.7 |
| 5,639,049 A | 6/1997 | Jennings et al. | |
| 6,409,223 B1 * | 6/2002 | Bartholoma | F16L 3/1226 285/114 |
| 6,508,440 B2 | 1/2003 | Schmidt | |
| 6,857,606 B1 * | 2/2005 | Gretz | F16L 3/223 248/68.1 |
| 7,455,268 B2 | 11/2008 | Heath | |
| 7,455,278 B2 * | 11/2008 | Hsu | A47J 37/041 248/300 |
| 7,537,183 B2 * | 5/2009 | Karamanos | F24D 19/02 138/103 |
| 7,784,745 B2 | 8/2010 | Dodge | |
| 7,832,248 B2 | 11/2010 | Heath | |
| 8,079,552 B2 * | 12/2011 | Sweigard | F16L 3/1233 24/336 |
| 8,091,846 B1 * | 1/2012 | Britner | B25H 1/00 248/219.3 |
| 8,376,289 B2 | 2/2013 | Heath | |
| 8,382,046 B2 * | 2/2013 | Holland, Jr. | A01G 25/00 239/204 |
| 8,439,316 B2 * | 5/2013 | Feige | F16L 3/13 248/71 |
| 2002/0047073 A1 * | 4/2002 | Deciry | H02G 3/32 248/49 |
| 2008/0142646 A1 * | 6/2008 | Magno | F16L 3/02 248/65 |
| 2009/0065657 A1 * | 3/2009 | Heath | F16L 3/1215 248/65 |
| 2009/0065659 A1 | 3/2009 | Dann | |
| 2009/0134282 A1 * | 5/2009 | Grim, Sr. | F16L 3/127 248/56 |
| 2009/0173844 A1 * | 7/2009 | Huo | H02G 3/32 248/65 |

FOREIGN PATENT DOCUMENTS

| | | | |
|---|---|---|---|
| FR | 2213696 A5 * | 8/1974 | F16L 3/1215 |
| GB | 1371850 A * | 10/1974 | F16B 2/22 |
| WO | WO 9635903 A1 * | 11/1996 | F16L 3/1008 |

* cited by examiner

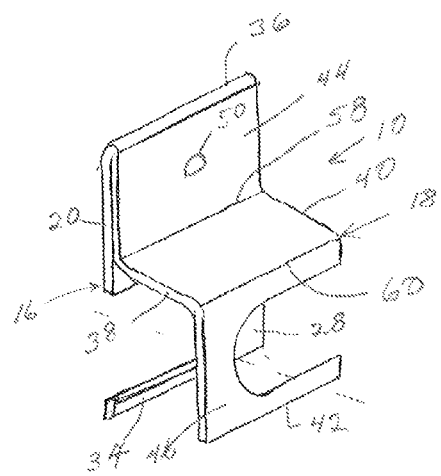
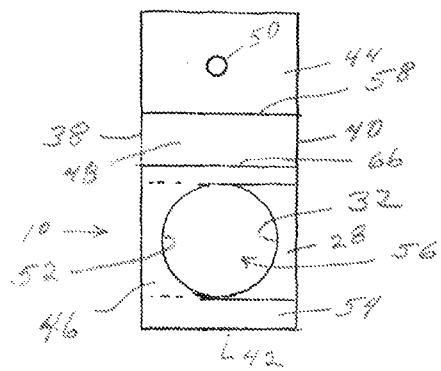
FIG. 3   FIG. 4
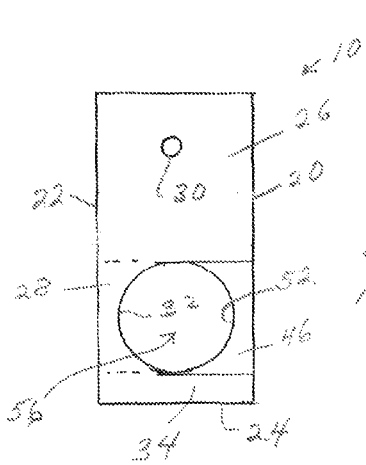
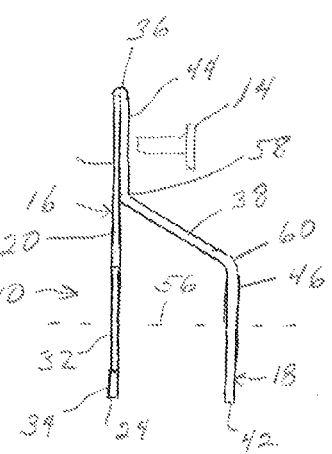
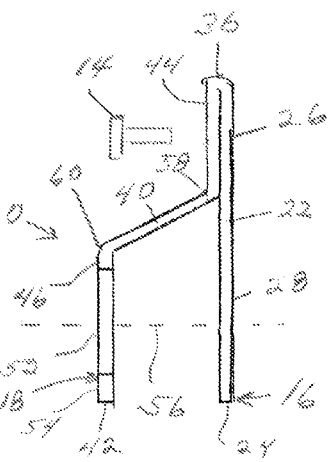
FIG. 5   FIG. 6   FIG. 7

CONDUIT HANGER

CROSS-REFERENCE TO RELATED APPLICATION

This application claims priority to U.S. Provisional Application No. 61/857,028 filed Jul. 22, 2013 which is hereby incorporated by reference in its entirety.

FIELD OF THE INVENTION

The present invention is directed to a hanger for an electrical conduit. The invention is particularly directed to a hanger or support member for electrical metal or plastic conduits and tubing that can be attached to a support, such as a ceiling joist.

BACKGROUND OF THE INVENTION

Hangers and supports are commonly used during construction to support conduits and pipes to an overhead support member such as ceiling joist or wall stud. The hangers generally have a passage or opening for receiving the conduit that are attached to the support member.

Several devices have been produced and proposed that can be attached to the ceiling, joist or stud and are able support a bundle of wires or a conduit. One example is disclosed in U.S. Pat. No. 1,416,679 to Barry which discloses a pipe or conduit hanger for attaching to an I-beam. The hanger has a U-shaped portion for supporting the conduit and a leg that hooks over a horizontal surface of the I-beam. A wedge is inserted into the hanger to fix the position of the hanger with respect to the I-beam.

U.S. Pat. No. 3,532,311 to Havener discloses the spring clip hanger for a conduit having a pair of tabs with hooks that are inserted through the opening or slot in a channel shaped support.

U.S. Pat. No. 4,039,744 to Seaquist discloses electrical bus support having a pair of opposing hook portions attached to a base. The hook portions hook to the tubular bus for suspending the insulator.

U.S. Pat. No. 7,097,015 to Frishman discloses a ceiling hook mounted to the ceiling by a screw. The hook has a generally helix shape.

U.S. Pat. No. 4,858,861 to Wilkinson discloses a clamp type pipe shoe for supporting a pipe above the pipe rack. The assembly includes two U-shaped members that are pivotally connected together to wrap around the pipe. The U-shaped members are secured to the base by a screw to secure the pipe to the base.

U.S. Pat. No. 4,870,722 to Shell discloses a cable clamp having a pair of semicircular shaped members that are hinged to a base. The semicircular shaped members close around the cable and secure the cable to the base.

U.S. Pat. No. 4,991,801 to Trumbull discloses a universal support strap. The support strap has a pair of jaws which can open to receive the pipe. The jaws are spring biased to close around the pipe. A plurality of flanges are provided at different angles to mount the support in various locations as shown in FIGS. 2, 3 and 4.

U.S. Pat. No. 5,639,049 to Jennings discloses a compact cable clip having a spring biased arm with a hooked end for hooking to a hook on the base. The base is attached to a support by a screw or other fastener.

U.S. Pat. No. 6,508,440 to Schmidt discloses a one-piece conduit hanger for attaching to a longitudinal channel of a metal framing member. The hanger has hooks on each of the legs for hooking onto the inner edge of the channel.

U.S. Pat. No. 7,784,745 to Dodge discloses a tube clip mounted to a channel-section track. The clip has a base with downwardly extending legs having a hook for hooking onto the edge of the channel-section track. The body of the clip is formed by two flexible semicircular sections that bend around the tube. The ends of the flexible sections have a hook and a recess for coupling the ends together.

U.S. Pat. No. 8,376,289 to Heath discloses an offset hanger having a central retainer portion and first and second legs. The central portion has a cylindrical inner surface for receiving the pipe. The legs have outwardly extending feet for attaching to a support surface by the screw or other fastener.

U.S. Patent Publication No. 2009/0065659 to Dann discloses a pipe spacer and clamp. The clamp supports the plate to space the pipe from the support surface. The clamp is formed as a one-piece member having a circular portion for receiving the pipe and a pair of outwardly extending feet for attaching to the support.

While these devices are generally suitable for their intended purpose, there is a continuing need in the industry for improvements to the devices.

SUMMARY OF THE INVENTION

The present invention is directed to a hanger and mounting member for supporting wires and/or a conduit to a support. The invention is particularly directed to a one piece hanger member and mounting member that can be produced from a folded blank during manufacture or at the time of installation for supporting and hanging a conduit, bundle of wires or other article to a support member. The hanger can also be attached to a wall surface to support a conduit extending through an opening in the wall.

The hanger of the invention is a one piece member that can be easily manufactured and formed to the desired shape for supporting a conduit or bundle of wires. The hanger is easily and quickly coupled to the conduit and/or bundle of wires and then attached to a support by a suitable fastener. In one embodiment, the hanger is mounted to a vertically oriented surface for supporting a conduit extending in a substantially transverse direction to the plane of the support surface.

The hanger and mounting member is suitable for attaching to vertical and horizontal surfaces of a support such as a ceiling joist. The hanger is particularly suitable for attaching to a vertical side surface of a ceiling joist where the conduit or wires are supported below the bottom edge of the ceiling joist. The hanger can be mounted to a side of a ceiling joist to support a conduit extending in a direction substantially transverse to a longitudinal direction of the ceiling joist. Mounting the hanger member to the side of the support allows the weight to be applied transversely to the longitudinal dimension of the fastener that extends into the vertical surface of the support.

The hanger member is formed from a blank and has a first leg and a second leg where each leg has an open recess extending from opposite sides for retaining a conduit or other article in the recesses. The open ends of the respective recess facing in opposing directions capture the conduit to prevent separation after the hanger is fixed to the support. The legs are spaced apart a distance so that the legs can be positioned on opposite sides of a conduit and then rotated or twisted so that the recesses in the legs receive the conduit and the conduit extends perpendicular to a plane of the legs and the hanger member.

The hanger member includes a first leg and a second leg coupled to the first leg by a fold line so that at least a portion of the legs are superimposed on each other and coextensive.

The superimposed portions of the legs can have aligned apertures for receiving a fastener that extends through each of the legs for attaching to a support, such as a ceiling joist. In one embodiment, the fastener extends substantially perpendicular to the plane of the first leg and the second leg.

The hanger is formed from a first leg and a second leg where the top portions of the legs are superimposed and the bottom portions of the legs are spaced apart a distance for receiving and supporting a conduit or other article. Each leg is provided with an oppositely facing recess for receiving and supporting the conduit.

The various features of the invention are basically attained by providing a one-piece, integrally formed hanger member comprising a first leg having a first longitudinal side edge, a second longitudinal side edge, a bottom portion and the top portion. The bottom portion has a first substantially U-shaped recess extending inwardly from the first side edge toward the second side edge where the first U-shaped recess has a dimension to receive a conduit. The second leg has a first longitudinal side edge and a second longitudinal side edge, a bottom portion and a top portion. The bottom portion has a second substantially U-shaped recess extending inwardly from said second side edge toward said first side edge and extends in a direction opposite the first U-shaped recess. The bottom portion of the first leg is spaced from the bottom portion of the second leg a distance to receive the conduit. The top portion of the first leg and the top portion of the second leg are contiguous and substantially parallel to each other.

The various features of the invention are also attained by providing a one piece, integrally formed hanger member comprising a substantially planar first leg having a first longitudinal side edge and a second longitudinal side edge, a top portion with the top edge and a bottom portion with a bottom edge. The bottom portion has an open recess extending inwardly from the first side edge. A second leg has a first longitudinal side edge and a second longitudinal side edge, a top portion with the top edge where a top portion is superimposed on the top portion near the first leg. The second leg has a bottom portion of the bottom edge and an open recess extending inwardly from the second side edge in a direction opposite the first recess. The first recess and a second recess are aligned to define a conduit passage extending through the first leg and the second leg.

The various features of the invention are further attained by providing a blank for forming a conduit hanger member where the blank comprises a substantially flat sheet metal body having a first longitudinal side edge, a second longitudinal side edge, a first end edge and a second end edge. A first transverse fold line extends between the first side edge and the second side edge defining the first leg portion and a second leg portion connected by the first fold line. The first fold line is oriented substantially perpendicular to a longitudinal axis of the blank. A first open recess is provided in the first leg portion and extends inwardly from the first side edge and is positioned proximate the first end edge. A second open recess is provided in the second leg portion and extends inwardly from the second side edge and is positioned proximate a second end edge.

The features of the invention are obtained by providing a one-piece integrally formed mounting clip for suspending a conduit comprising a first leg having a first side edge and a second side edge, a bottom portion and a top portion. The bottom portion has a first substantially U-shaped recess extending inwardly with respect to the first side edge toward the second side edge. The first U-shaped recess has a dimension to receive the conduit. A second leg has a first side edge and a second side edge, a bottom portion, a top portion and a flange extending between the top portion and bottom portion. The bottom portion has a substantially U-shaped recess extending inwardly from the second side edge toward the first side edge and extending in a direction opposite the first U-shaped recess. The connecting portion extends outwardly from the top portion to space the bottom portion of the first leg from the bottom portion of the second leg a distance to receive the conduit. The top portion of the first leg and the top portion of the second leg overlie each other for attaching to a support.

These and other aspects of the invention will become apparent from the following detailed description of the invention, which in conjunction with the annexed drawings disclose various embodiments of the invention.

BRIEF DESCRIPTION OF THE DRAWINGS

The following is a brief description of the drawings in which:

FIG. 3 is a perspective view of the hanger member in one embodiment of the invention;

FIG. 4 is a front view of the hanger member of FIG. 3;

FIG. 5 is a rear view of the hanger member of FIG. 3;

FIG. 6 is a left side view of the hanger member of FIG. 3;

FIG. 7 is a right side view of the hanger member of FIG. 3;

DESCRIPTION OF THE INVENTION

Figure 1:
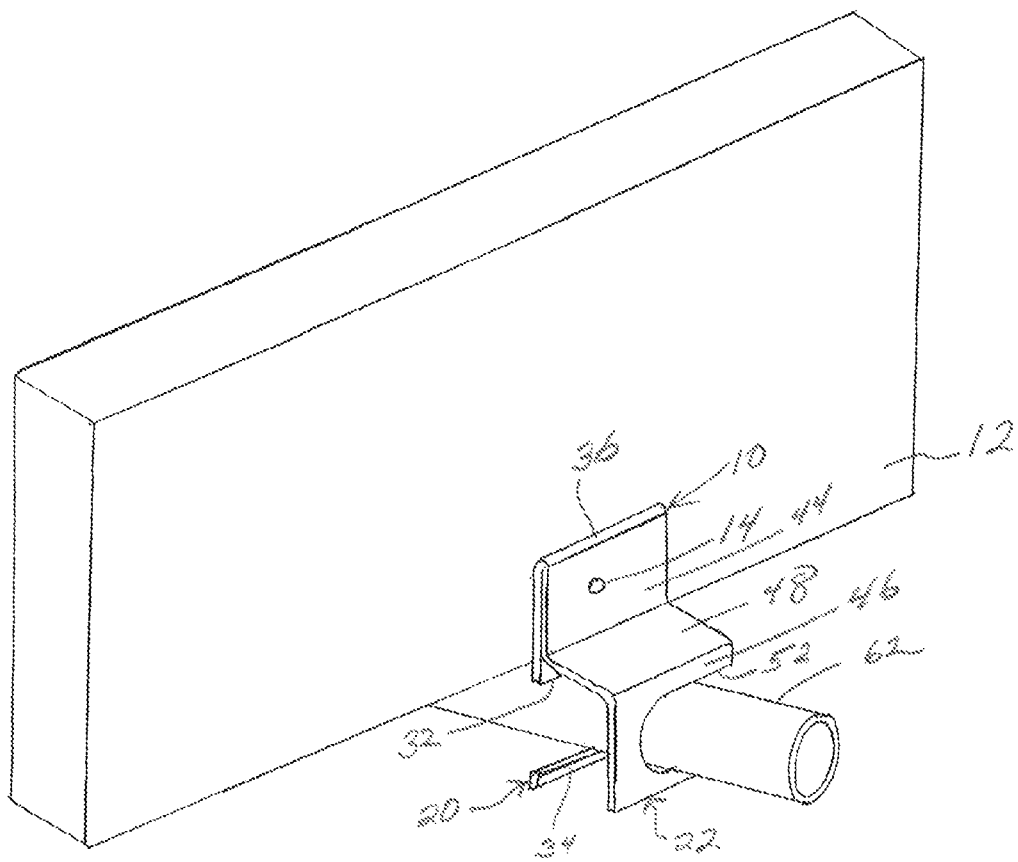
FIG. 1 is a perspective view of the hanger member attached to a support.

The present invention is directed to a hanger member for use in supporting the conduit and particularly a metal or plastic conduit for carrying electrical wiring. The hanger member of the invention is made as a one piece unitary unit formed from a metal blank that is folded and shaped to support the conduit. In a preferred embodiment, the hanger member is constructed to attach to the vertical side face of a ceiling joist to suspend the conduit below the ceiling joist and extending in a direction perpendicular to the longitudinal dimension of the ceiling joist. In one embodiment, the hanger is attached to a vertical surface of a support for supporting a conduit or other article extending substantially transverse to the surface of the support.

Referring to the drawings, the hanger member 10 can be attached to the side edge of a ceiling joist 12 or other support using a fastener such as a nail 14 or screw. The hanger member 10 functions as a mounting clip or supporting device that is capable of supporting a conduit, a bundle of wires or other components that require attachment to a support, and particularly to a ceiling support. In one preferred embodiment, the hanger member 10 is formed as a one-piece, unitary member. Typically, the hanger member is formed from sheet steel, aluminum or other metal that can be cut into a blank and folded to form the hanger member as shown in the drawings.

The hanger member 10 of the invention is suitable for attaching to a surface of a supporting structure or member such as a ceiling joist, ceiling panel, wall panel or wall stud to support the conduit or wires below the supporting structure. In the embodiments shown, the hanger member is suitably adapted for attaching to a side surface of the ceiling joist 12 or other vertical surface so that the conduit is suspended below the ceiling joist and allows the conduit to extend in a direction transverse to the longitudinal dimension of the ceiling joist.

Figure 2:
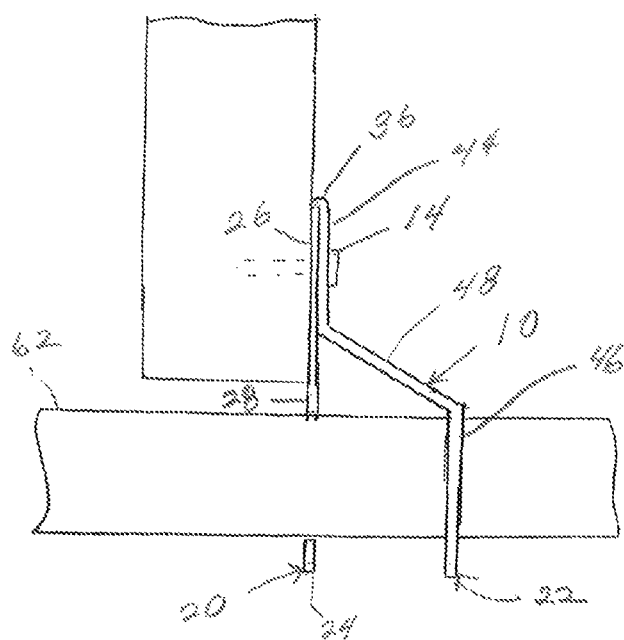
FIG. 2 is an end view of the hanger member of FIG. 1.

As shown in FIG. 2, the hanger member 10 includes a first leg 16 and a second leg 18. In one embodiment, the first leg 16 is coupled to the second leg along a top edge of the first leg and a top edge of the second leg by a fold line 36 to define a top edge of the hanger member.

The first leg 16 in the embodiment shown has a substantially flat planar configuration having a length sufficient to attached to a support such as the ceiling joist 12 and for supporting a conduit, bundle of wires or other component. The first leg 16 has a first longitudinal side edge 20, and a second longitudinal side edge 22 opposite and parallel to the first longitudinal side edge 20. A bottom edge 24 extends transversely between the first longitudinal side edge 20 and the second longitudinal side edge 22. In the embodiment shown, the bottom edge is substantially perpendicular to the longitudinal side edges.

The first leg 16 has a top portion 26 and a bottom portion 28. The top portion 26 has an aperture 30 for receiving the fastener 14. The aperture 30 is generally located in a central area of the top portion. Although a single aperture is shown, a plurality of apertures can be provided as desired. In other embodiments, a tab can be cut and bent from the top portion to define a nailing tab for attaching and positioning the hanger member 10 to the support. Typically, the nailing tab is used in conjunction with the fastener 14 for securing the hanger member to the support.

The bottom portion 28 of the first leg 16 has an open recess 32 with a dimension for receiving a conduit as shown in FIG. 1. The open recess 32 in the embodiment shown has a substantially U-shape and has an open end on the first longitudinal side edge 20 so that the open recess 32 extends inwardly toward the second longitudinal side edge 22. As shown, the bottom portion of the recess 32 is spaced a distance from the second longitudinal side edge a distance to provide sufficient strength for supporting the conduit. The open recess 32 is provided proximate the bottom edge 24 and is spaced from the bottom edge 24 a distance to define a tab 34 for supporting the conduit.

The second leg 18 is coupled to the first leg 16 along the respective top edges by the fold line 36 so that at least a portion of the second leg 18 overlies and is coextensive with the first leg 16 and has a longitudinal dimension substantially parallel to the longitudinal dimension of the first leg 16. The second leg 18 has a first longitudinal side edge 38 and a second longitudinal side edge 40 opposite the first longitudinal side edge 38. In the embodiment shown, the first longitudinal side edge 38 is substantially parallel to the second longitudinal side edge 40. A transverse bottom edge 42 extends between the first longitudinal side edge 38 and the second longitudinal side edge 40. In one embodiment the invention, the bottom edge 42 is substantially perpendicular to the first longitudinal side edge 38 and the second longitudinal side edge 40.

The second leg 18 is defined by a top portion 44 and a bottom portion 46. In the embodiment shown, the top portion 44 is coupled to the bottom portion 46 by a connecting portion 48. The top portion 44 is oriented substantially parallel to the top portion 26 of the first leg 16. In the embodiment shown, the top portion 44 of the second leg 18 is contiguous with and overlies the top portion 26 of the first leg 16. The top portion 44 includes an aperture 50 for receiving the fastener 14. The aperture 50 is positioned in the top portion 44 so that the aperture 50 is aligned with and coaxial with the aperture 30 in the first leg 16.

The bottom portion 46 of the second leg 40 is preferably oriented substantially parallel to the bottom portion 28 of the first leg 16 and spaced outwardly from the first leg 16 as shown in FIG. 3. An open recess 52 is provided in the second longitudinal side edge 40 of the second leg 18 and extends toward the first longitudinal side edge 38. The recess 52 has a substantially U-shape and is positioned proximate the bottom edge 42 to define a tab 54. The second recess 52 extends from the second longitudinal side edge 40 toward the first longitudinal side edge 38 so that the bottom portion of the recess 52 is spaced from the first longitudinal side edge 38 a distance to provide sufficient strength for supporting a conduit.

As shown in the drawings, the second recess 52 extends in a direction opposite the first recess 32 so that the open ends of the recesses face in opposite directions. The second recess 52 is aligned with the first recess 32 to define a conduit passage 56 extending through the hanger member 10. The conduit passage 56 is defined by the open recesses 32 and 52 with the open ends of the recesses facing in opposite directions and the respective tabs 34 and 54 being aligned and substantially parallel to each other for supporting the conduit as shown in FIG. 1.

A connecting portion 48 extends between the top portion 44 and the bottom portion 46 of the second leg 18 to space the bottom portion 46 outwardly from the bottom portion 28 of the first leg 16 a distance sufficient to receive the conduit. The connecting portion 48 has a first end connected to the bottom end of the top portion 44 by the fold line 58. The connecting portion 48 has a second edge opposite the first edge and connected to the top edge of the bottom portion 46 by a fold line 60.

Figure 9:
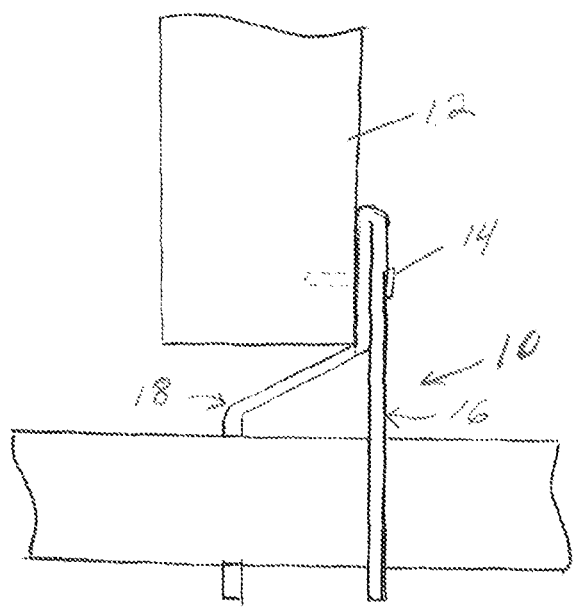
FIG. 9 is an end view showing the hanger member attached to a support for supporting a conduit.

The hanger member 10 is coupled to the conduit 62 by positioning the hanger member 10 over the conduit with the first leg 16 and the second leg 18 on opposite sides of the conduit and with the respective recesses 32 and 52 aligned with the conduit so that the conduit extends between the first leg 16 and the second leg 18 substantially parallel to the legs. The hanger member 10 is then rotated to position the conduit 62 within the recesses 32 and 52. The hanger member 10 is then attached to the support structure such as the ceiling joist 12 by the fastener 14 extending through the apertures in the hanger 10. The hanger 10 can be mounted to the support structure with the first leg 16 contacting the side surface of the support as shown in FIGS. 1 and 2. The hanger 10 can also be attached to the ceiling joist 12 with the top portion 44 of the second leg 18 abutting the side surface of the ceiling joist as shown in FIG. 9.

Figure 8:
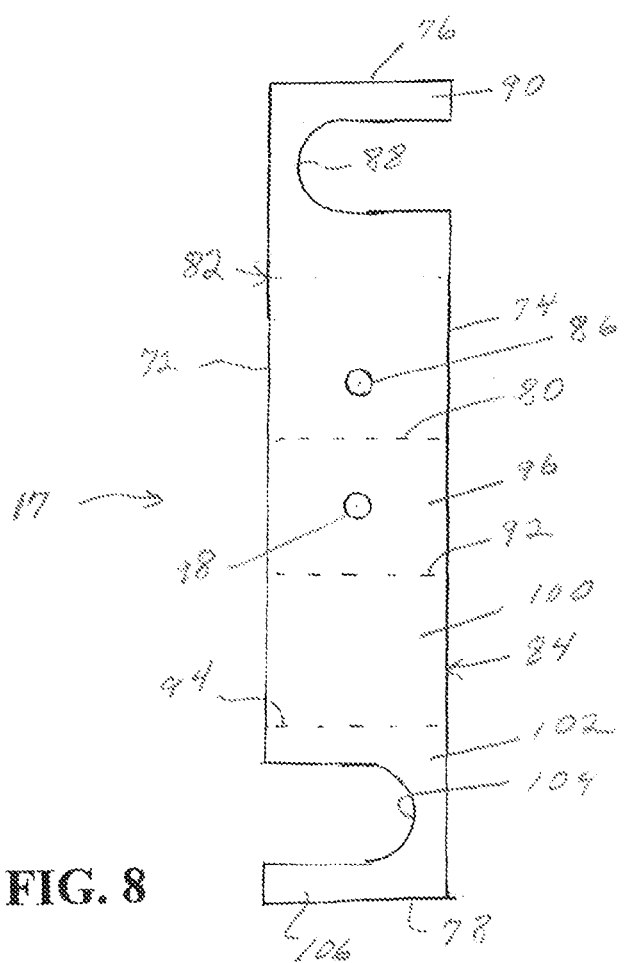
FIG. 8 is a top plan view of the blank for forming the hanger member of FIG. 3.

The hanger member 10 is formed from a sheet metal blank 70 as shown in FIG. 8. The blank 70 as shown has a substantially rectangular configuration with a first longitudinal side edge 72 and an opposite second longitudinal side edge 74. A first transverse end edge 76 extends between the first side edge 72 and the second side edge 74. A second transverse end edge 78 opposite the first end edge 76 extends between the first side edge 72 and the second side edge 74.

The blank 70 has a first fold line 80 extending between the first side edge 72 and the second side edge 74 to define a first leg portion 82 and a second leg portion 84. The first leg portion 82 includes an aperture 86 proximate the fold line 80. A substantially U-shaped recess 88 extends inwardly from the first side edge 72 toward the second side edge to form a tab 90 between the first recess 88 and the first end edge 76.

The second leg portion has a second fold line 92 and a third fold line 94 extending between the first longitudinal side edge 72 and the second longitudinal side edge 74. The second fold line 92 is positioned between the first fold line 80 and the second end edge 78 to define a top portion 96 of the second leg portion 82. An aperture 98 is provided in the top portion 96. The second fold line 92 and the third fold line 94 define a connecting portion 100 extending between the top portion 96 and a bottom portion 102 at the second end edge 78. The bottom portion 102 has a substantially U-shaped recess 104 extending inwardly from the second longitudinal side edge 74 toward the first longitudinal side edge 72. The recess 104 is spaced from the second end edge 78 a distance to define a tab 106.

The blank 70 is folded to form the hanger member 10 by folding the blank along the fold line 80 so that the top portion of the first leg portion 82 overlies and is coextensive with the top portion 96 of the second leg portion 84. The second leg portion 84 is bent along the fold lines 92 and 94 to space the bottom portion 102 outwardly from the bottom portion of the first leg portion to the position shown in FIG. 3. The apertures 86 and 98 are positioned in the respective leg portions so that the apertures are aligned to receive a fastener for coupling the resulting hanger member 10 to a support.

While various embodiments have been chosen to illustrate the invention, it will be understood by those skilled in the art that various changes and modifications can be made without departing from the spirit and scope of the invention as defined in the appended claims.

What is claimed is:

1. A one-piece integrally formed hanger member comprising:
   a first leg having a first longitudinal side edge, a second longitudinal side edge, a bottom portion, and a top portion having a planar surface, said bottom portion having a first substantially U-shaped recess extending inwardly from said first side edge toward said second side edge, the first U-shaped recess having a dimension to receive a conduit; and
   a second leg having a first longitudinal side edge, a second side edge, a bottom portion, and a top portion having a planar surface, said bottom portion having a substantially U-shaped recess extending inwardly from said second side edge toward said first side edge and extending in a direction opposite said first U-shaped recess, said bottom portion of said first leg being spaced from the bottom portion of the second leg a distance to receive the conduit, and where the planar surface of said top portion of the first leg and the planar surface of said top portion of the second leg are in contact with each other and contiguous and substantially parallel to each other.

2. The hanger member of claim 1, wherein
the first U-shaped recess of said first leg is aligned with said second U-shaped recess of said second leg to define a conduit passage.

3. The hanger member of claim 2, wherein
said top portion of said first leg is superimposed on and coextensive with said top portion of said second leg, and where said first leg is coupled to said second leg by a fold line.

4. The hanger member of claim 2, wherein
said top portion of said first leg has an aperture configured for receiving a fastener, and
said top portion of said second leg has an aperture coaxially aligned with said aperture of said first leg and configured for receiving the fastener.

5. The hanger member of claim 2, further comprising
an aperture for receiving a fastener extending through said top portion of said first leg and said top portion of said second leg, wherein said aperture is substantially parallel to said conduit passage.

6. The hanger member of claim 2, wherein
a top edge of said first leg is coupled to a top edge of said second leg by a fold line.

7. The hanger member of claim 2, wherein
said bottom portion of said second leg is spaced outwardly from the planar surface of said top portion of said second leg with respect to said conduit passage.

8. The hanger member of claim 1, wherein
said planar surface of said top portion of said second leg is substantially parallel to a plane of said bottom portion, and where said bottom portion of said second leg is spaced outwardly from said top portion of said second leg and from said bottom portion of said first leg.

9. The hanger member of claim 8, further comprising
a connecting portion having a first end coupled to a bottom end of said top portion of said second leg, and coupled to a top end of said bottom portion of said second leg, said connecting portion extending away from said first leg to space said bottom portion of said second leg from said bottom portion of said first leg.

10. A one piece, integrally formed hanger member comprising:
    a substantially planar first leg having a first longitudinal side edge and a second longitudinal side edge, a top portion with a top edge and a bottom portion with a bottom edge, said top portion having a first aperture configured for receiving a fastener, said bottom portion having an open recess extending inwardly from said first side edge; and
    a second leg having a first longitudinal side edge, a second longitudinal side edge, a top portion with a top edge, said top portion being superimposed on said top portion of said first leg, and a bottom portion with a bottom edge, said bottom portion having an open recess extending inwardly from said second side edge in a direction opposite said first recess, said first recess and said second recess being aligned to define a conduit passage extending through said first leg and second leg, said top portion of said second leg having a second aperture configured for receiving the fastener, said first aperture and said second aperture being coaxially aligned and having an axis substantially parallel to an axis of said conduit passage.

11. The hanger member of claim 10, wherein
said bottom portion of said first leg is spaced apart from said bottom portion of said second leg a distance sufficient to receive a conduit and to position the conduit in said conduit passage.

12. The hanger member of claim 11, wherein
said top portion of said second leg is substantially parallel to said bottom portion, and where said bottom portion of said second leg is spaced from said top portion of said second leg and is spaced from said first leg.

13. The hanger member of claim 10, further comprising
a connecting portion having a first end coupled to a bottom end of said top portion of said second leg, and a second end coupled to a top end of said bottom portion of said second leg.

14. The hanger member of claim 13, wherein
said connecting portion extends away from said first leg and from said top portion of said second leg.

15. The hanger member of claim 14, wherein
said first end of said second portion is coupled to said bottom end of said top portion by a fold line, and
said second end of said connecting portion is coupled to said top end of said bottom portion by a fold line.

16. The hanger member of claim 10, wherein said top edge of said first leg is coupled to said top edge of said second leg by a fold line.

17. A blank for forming a conduit hanger member, said blank comprising:

a substantially flat sheet metal body having a first longitudinal side edge, a second longitudinal side edge, a first end edge and a second end edge;

a first transverse fold line extending between said first side edge and said second side edge defining a first leg portion and a second leg portion connected by said fold line, said first fold line oriented substantially perpendicular to a longitudinal axis of said blank;

a first open recess provided in said first leg portion and extending inwardly from said first side edge and positioned proximate said first end edge;

a first aperture in said first leg portion proximate said first fold line;

a second open recess provided in said second leg portion and extending inwardly from said second leg and positioned proximate said second end edge; and a second aperture in said second leg portion proximate said first fold line, wherein said second aperture is superimposed on said first aperture by folding said second leg portion over said first leg portion about said first fold line.

18. The blank of claim 17, further comprising a second fold line extending between said first side edge and said second side edge and oriented between said first fold line and said second open recess; and a third fold line extending between said first side edge and said second side edge, said third fold line being substantially parallel to said second fold line and oriented between said second fold line and said second open recess.

\* \* \* \* \*